United States Patent
Schiller et al.

(10) Patent No.: US 6,570,287 B1
(45) Date of Patent: May 27, 2003

(54) SPRING ELEMENT FOR COMPENSATING AXIAL PLAY IN A MOTOR SHAFT OF AN ELECTRIC MOTOR

(75) Inventors: Herbert Schiller, Buehlertal (DE); Herbert Martin, Buehlertal (DE); Michael Bohnert, Achern (DE); Markus Boldt, Achern (DE); Ulrich Rettmar, Gernsbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,412

(22) PCT Filed: Feb. 8, 2001

(86) PCT No.: PCT/DE01/00488

§ 371 (c)(1), (2), (4) Date: Jan. 31, 2002

(87) PCT Pub. No.: WO01/59913

PCT Pub. Date: Aug. 16, 2001

(30) Foreign Application Priority Data

Feb. 9, 2000 (DE) .......................... 100 05 568

(51) Int. Cl.⁷ .................................................. H02K 5/00
(52) U.S. Cl. ........................................................ 310/91
(58) Field of Search ............................. 310/91, 90, 83, 310/42

(56) References Cited

U.S. PATENT DOCUMENTS

| 2,307,772 A | | 1/1943 | Charles ...................... 384/425 |
| 5,006,765 A | * | 4/1991 | Schmider ...................... 310/71 |
| 5,624,193 A | * | 4/1997 | Vogelsberger et al. ...... 267/163 |

FOREIGN PATENT DOCUMENTS

| EP | 0 303 147 A | 2/1989 |
| EP | 0 723 087 A | 7/1996 |
| GB | 788 268 A | 12/1957 |
| GB | 1 428 998 A | 3/1976 |

* cited by examiner

Primary Examiner—Nestor Ramirez
Assistant Examiner—Hanh Nguyen
(74) Attorney, Agent, or Firm—Michael J. Striker

(57) ABSTRACT

The invention relates to a spring element (10) for compensating for axial play in a motor shaft of an electric motor. The invention proposes embodying such a spring element (10) out of plastic and of one piece with a stop disk (12), which is connected via spring arms (14) to a support foot (16), and placing it, along with the support foot (16), onto a support sleeve (18) with which the spring element (10) can be press-fitted onto the motor shaft. The invention has the advantage that it eliminates the axial play in the motor shaft of an electric motor with a spring element (10) that is inexpensive to manufacture and easy to install (FIG. 1).

5 Claims, 1 Drawing Sheet

SPRING ELEMENT FOR COMPENSATING AXIAL PLAY IN A MOTOR SHAFT OF AN ELECTRIC MOTOR

PRIOR ART

Figure 1:
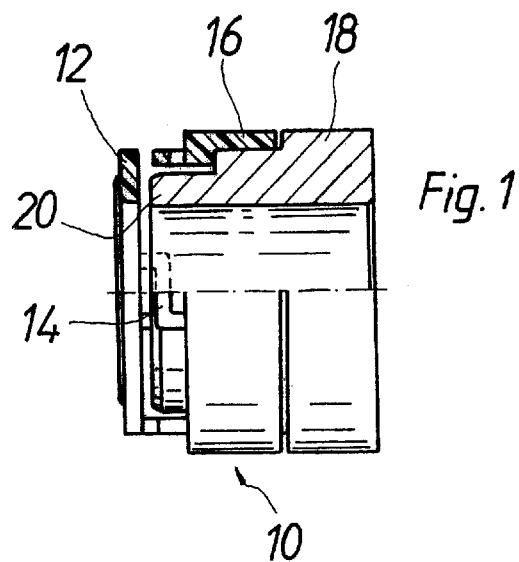

The invention relates to a spring element for compensating for axial play in a motor shaft of an electric motor, as generically defined by the preamble to the main claim.

Motor shafts of known electric motors are supported with axial play in a motor housing. The axial play in the motor shaft is necessary because of or also as a result of manufacturing tolerances. In addition, an axial play in the motor shaft and the motor housing is necessary because of the different thermal expansions of the motor shaft and the motor housing. The axial play in the motor shaft results in noise that is partially a function of the position of the electric motor and in part, leads to distinctly audible impact noises during changes in the rotation direction of the electric motor. In addition, axial vibrations of the armature can occur, which result in noise and increased wear.

For this reason, efforts have been made to compensate for the axial play in the motor shaft through the use of spring elements. Thus, for example, U.S. Pat. No. 2,307,772 has proposed placing a convex spring washer onto the motor shaft as a spring element, which is supported against a motor shaft bearing and an armature that is affixed to the shaft and as a result, compensates for axial play in the motor shaft. However, a large number of parts is required in order to install the spring washer. The spring washer is connected to two flat support washers and parts are provided, which secure the spring washer to the motor shaft in a non-rotatable, axially movable fashion. The known spring element is therefore complex and expensive with regard to manufacture and installation.

ADVANTAGES OF THE INVENTION

The spring element according to the invention, with the features of claim 1, has a stop disk with which it is axially supported, for example against a shaft bearing of the motor shaft of the electric motor. One or more spring arms are connected to the motor shaft and are of one piece with it, which exert a spring force in the axial direction on the motor shaft and as a result, eliminate the axial play in the motor shaft. The spring element according to the invention has the advantage that it can be simply and inexpensively manufactured, for example by injection molding it, in particular out of plastic. Another advantage is the installation of the spring element according to the invention by simply sliding a single part onto the motor shaft. With the spring element according to the invention, the motor shaft is prestressed axially with a small amount of force and is secured in a particular position. Operating noise due to the axial play in the motor shaft is eliminated and noise during a change in the rotation direction is sharply reduced or possibly even eliminated. Axial vibrations of the motor shaft are also prevented. In addition, the spring element according to the invention compensates for different thermal expansions of the motor housing and motor shaft.

Advantageous embodiments and improvements of the invention disclosed in the main claim are the subjects of the dependent claims.

DRAWINGS

The invention will be explained in detail below in conjunction with an exemplary embodiment shown in the drawings.

Figure 2:
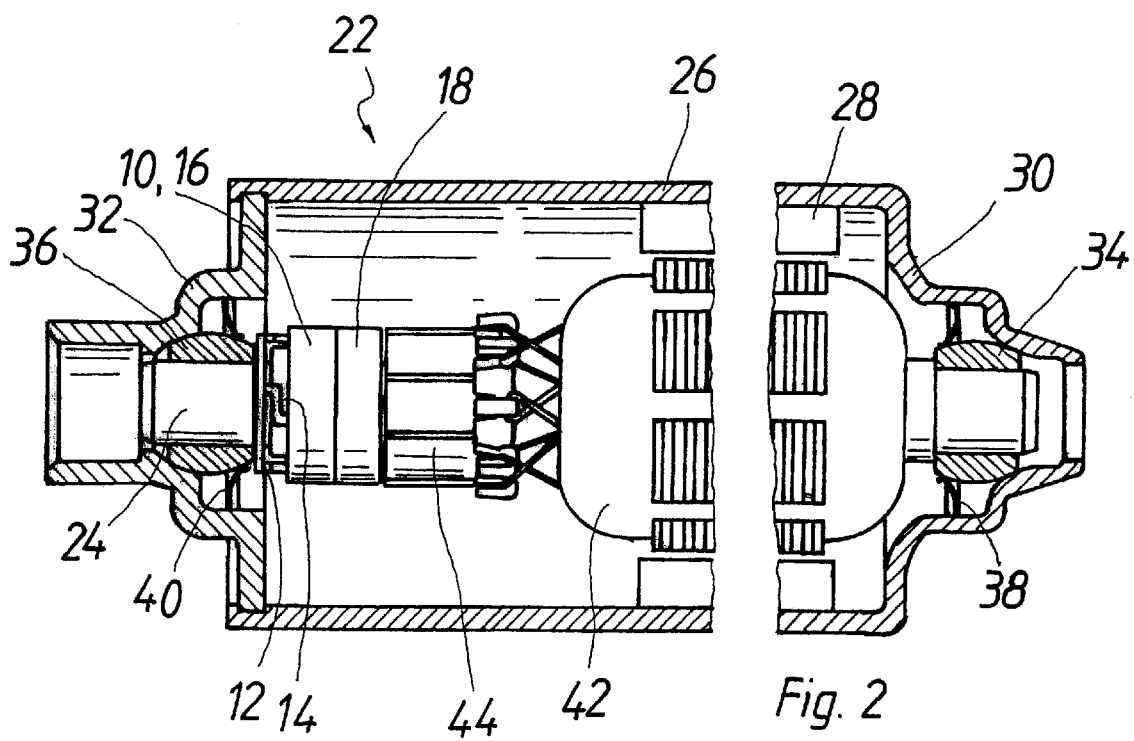

FIG. 1 is a half-sectional view of a spring element according to the invention; and FIG. 2 is a simplified depiction of an axial section through an electric motor with the spring element according to the invention from FIG. 1.

DESCRIPTION OF THE EXEMPLARY EMBODIMENT

The spring element 10 according to the invention shown in FIG. 1 has an annular stop disk 12 which is connected to a hollow cylindrical support foot 16 by means of spring arms 14 that are distributed over the circumference. The stop disk 12, the spring arms 14, and the support foot 16 are made of one piece by means of plastic injection molding. In their middle section, the spring arms 14 extend in the circumference direction and at both ends, they are bent at right angles into an axially parallel direction; at their two ends, they transition in one piece into the stop disk 12 and/or into the support foot 16. Due to the elasticity of the spring arms 14, the stop disk 12 is connected to the support foot 16 in an axially resilient fashion. A spring constant of the spring arms 14 is low so that an axial spring force of the spring element 10 is slight.

The hollow cylindrical support foot 16 is stepped on its inside. By means of the support foot 16, the spring element 10 is placed with a slight press-fit onto a support sleeve 18 whose outer diameter is stepped. The support sleeve 18 is essentially comprised of brass in the exemplary embodiment shown, but it can also be made of a different metallic or non-metallic material, for example also of plastic. The support sleeve 18 makes it possible to axially remove the spring element 10 from an injection molding tool, not shown, after the injection molding; the support sleeve 18 reduces an inner diameter of the support foot 16 of the spring element 10 to a diameter of a motor shaft of an electric motor. An inner diameter of the support sleeve 18 is less than an inner diameter of the stop disk 12. In the axial direction, the support sleeve 18 protrudes through the support foot 16 in the direction of the stop disk 12; it constitutes an axial stop 20 for the stop disk 12, which limits an axial spring path of the stop disk 12 in the direction of the support foot 16. In this manner, the spring element 16 has an axial stop 20 for the stop disk 12 separate from the spring arms 14, which prevents the spring arms 14 from being plastically deformed, broken, or damaged due to material fatigue. The axial stop 20 is separate from the spring arms 14; the axial spring path of the stop disk 12 is not limited by the contact of the spring arms 14 against the stop disk 12 and the support foot 16.

FIG. 2 shows an electric motor 22, whose motor shaft 24 is provided, according to the invention, with the spring element 10 from FIG. 1. The electric motor 22 is provided for use as a seat adjusting motor for an electrically adjustable seat of a motor vehicle. The electric motor 22 has a cup-shaped motor housing 26 whose inner circumference has permanent magnets 28 affixed to it. The motor shaft 24 is supported in rotary fashion at one end in a housing end wall 30 that is of one piece with the motor housing 26 and is supported at its other end in a housing cover 32, which is inserted into an open end of the motor housing 26. For the rotary support, spherical porous bearings 34, 36 are slid onto the ends of the motor shaft 24 and are respectively secured in the housing end wall 30 and in the housing cover 32, each by means of a respective spring washer 38, 40. An armature lamination bundle 42 with a winding and a commutator 44 is attached to the motor shaft 24 in a non-rotating manner.

Intrinsically known carbon brushes in sliding contact with the commutator 44 have been left out of the drawing for the sake of simplifying the depiction.

Between the commutator 44 and one of the two porous bearings 36, the spring element 10 according to the invention is press-fitted with its support sleeve 18 onto the motor shaft 24. The stop disk 12 of the spring element 10, which has a greater inner diameter than the support sleeve 18, can move freely on the motor shaft 24. The support sleeve 18 and the support foot 16 of the spring element 10 are oriented toward the commutator 44; the spring arms 14 press the stop disk 12 with a slight initial stress axially against the porous bearing 36. Due to the low spring constant of the spring arms 14, the prestressing force or the spring force is slight and consequently, so is a friction between the stop disk 12 and the porous bearing 36 during rotation of the motor shaft 24. Due to the low friction, the wear and power loss are likewise low.

The spring element 10 according to the invention, which secures the motor shaft 24 of the electric motor 22 in the axial direction with initial tension between the two porous bearings 34, 36, eliminates axial bearing play, prevents axial movements of the motor shaft 24, and compensates for manufacturing tolerances and thermal expansion differences between the motor housing 26 and the motor shaft 24. The axial stop 20 limits a maximal possible axial movement of the motor shaft 24 counter to the spring force of the spring arms 14 so that even with a fracture of the spring arms 14 or an axial load on the motor shaft 24 that is greater than a spring force of the spring arms 14, an axial mobility of the motor shaft 24 remains limited to a permissible value that does not impair the functioning of the electric motor 22.

What is claimed is:

1. A spring element for compensating for axial play in a motor shaft of an electric motor, characterized in that the spring element (10) has one or more spring arms (14) and a stop disk (12), which is of one piece with the spring arms (14), wherein the spring element (10) has a support foot (16), which is of one piece with the spring arms (14) and which can be used to fasten the spring element (10) to the motor shaft (24).

2. The spring element according to claim 1, characterized in that the spring arms (14) extend approximately in the circumference direction.

3. The spring element according to claim 1, characterized in that the spring element (10) is made of plastic.

4. The spring element according to claim 1, characterized in that the spring element (10) has an axial stop (20), which is separate from the spring arms (14) and limits a spring path of the spring element (10).

5. The spring element according to claim 1, characterized in that the spring element (10) has a support sleeve (18) upon which the support foot (16) is placed.

* * * * *